Sept. 16, 1969      L. MIZELL      3,467,360
DRAWWORKS
Filed Feb. 1, 1968      2 Sheets-Sheet 2
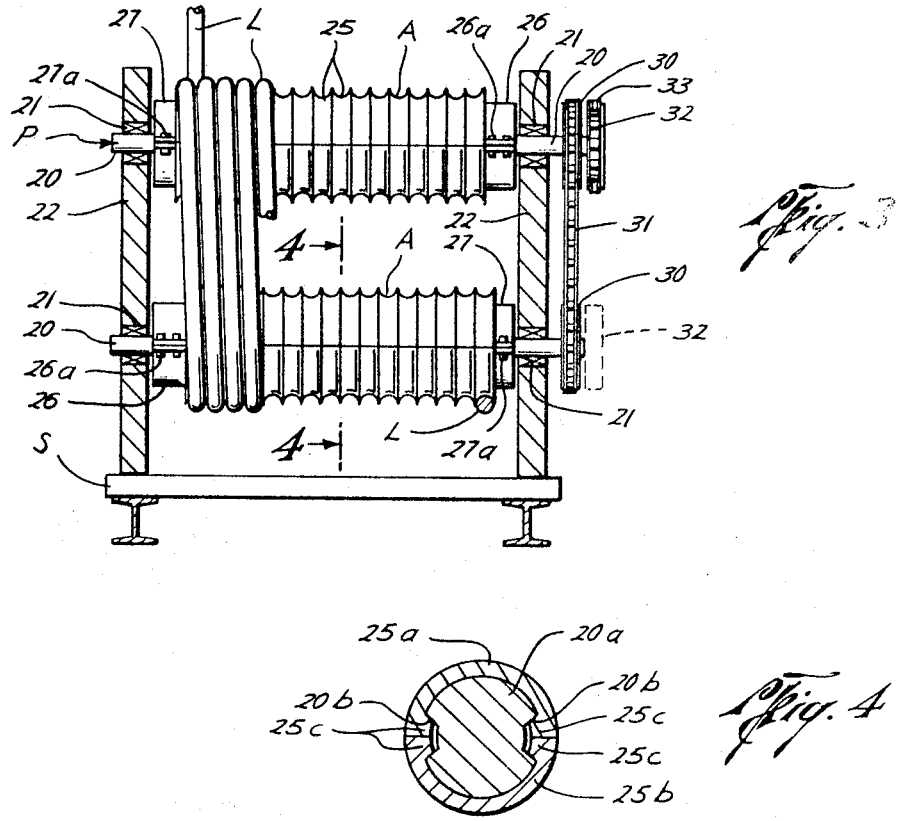
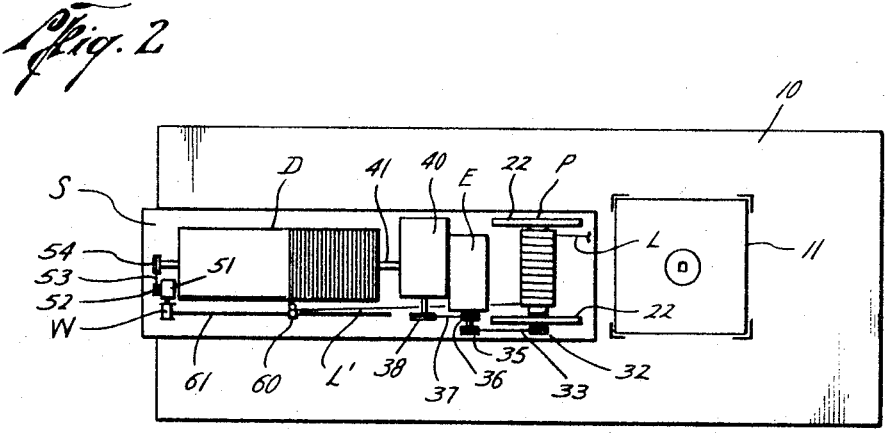
Leonard Mizell
INVENTOR
BY
Hayden Pravel Wilson & Matthews
ATTORNEYS

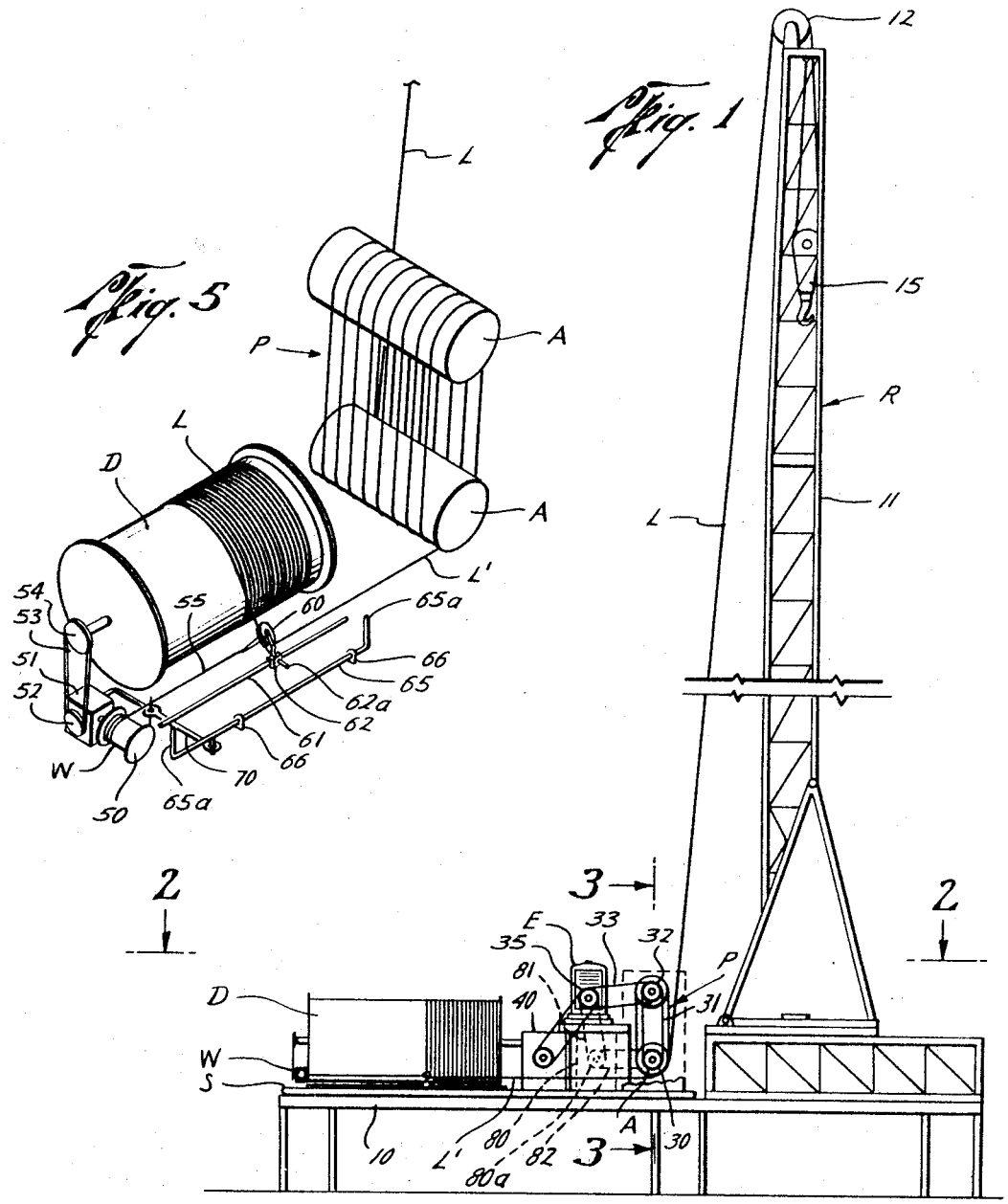

United States Patent Office 3,467,360
Patented Sept. 16, 1969

3,467,360
DRAWWORKS
Leonard Mizell, Box 1191, Liberty, Tex. 77575
Filed Feb. 1, 1968, Ser. No. 702,413
Int. Cl. B66d 1/76
U.S. Cl. 254—175.7
5 Claims

ABSTRACT OF THE DISCLOSURE

A drawworks or line handling apparatus wherein power means are provided for pulling a line having a load on one end thereof while feeding the other end of the line to a storage drum for winding the line thereon. The apparatus also provides for paying out or feeding off the line from the storage drum and power means at a controlled rate. The invention may be used as a drawworks for a drilling rig, for towing boats, pulling pipelines across rivers, bogs, and bays, and for other uses, particularly where heavy and long cables or other lines are required in conjunction with heavy loads.

BACKGROUND OF THE INVENTION

The field of this invention is cable or other line handling apparatus wherein the line is wound and unwound in use.

With prior drawworks and other line handling apparatus, the drum upon which the line was wound and unwound also was used for pulling the line to lift or otherwise move the loads on the line. With such prior constructions, the line was usually wrapped in multiple layers on the drum, and therefore, with each increase in the layers, the external diameter of the wraps of line increased, resulting in increased power being required to operate the drum at a constant speed, or a loss of speed, as it wound up the line on the drum. Additionally, the line was subjected to a crushing force, especially when pulling it in to wind it on the drum due to the load on the line, and this crushing force was exerted on the layers below the layer being wrapped to further crush and otherwise damage the line.

It has also been common for a line on such prior drum constructions to collect and build up several layers or wraps at just one end of the drum before reversing the direction of the wrapping, and then suddenly the overwraps are released, snapping and jumping, which causes breaking, tearing, bending, and other damage to the line.

THE PRESENT INVENTION

With the present invention, a power means is provided separately from a storage drum so that the disadvantages of the prior drawworks are eliminated. The power means of this invention receives only a single layer of the line in multiple sheaves so that a substantially constant pulling force and speed can be maintained for a given load regardless of the length of the line which is being pulled by the power means. The end of the line which is fed from the power means to the storage drum has substantially no strain thereon, and therefore, the line is wound up on the storage drum with such a small amount of power that the crush load on the line is insignificant. Since there is such a small load on the line when wrapping and unwrapping from the storage drums, the line can be readily controlled with a level wind or other suitable means to prevent a collection of wraps at either end to thereby prevent damage from such cause. When the invention is used at a drilling rig, since there is substantially no load on the length of the line being wound on and unwound from the storage drum of this invention, the storage drum may be long enough to receive all of the line thereon in a single wrap, thereby avoiding any crushing load from multiple wraps.

An automatic drive such as a hydramatic drive is also preferably employed with the storage drum for winding the line thereon and for controlling the feed-off of the line from the storage drum and the power means when paying out or feeding-off the line.

BRIEF DESCRIPTION OF THE DRAWINGS

FIG. 1 is an elevation of the preferred form of the apparatus of this invention, illustrating it in conjunction with a drilling rig derrick;

FIG. 2 is a plan view taken on line 2—2 of FIG. 1 to illustrate the embodiment of FIG. 1 further;

FIG. 3 is a view taken on line 3—3 of FIG. 1 to illustrate the preferred embodiment of the power means of the present invention;

FIG. 4 is a cross-sectional view taken on line 4—4 of FIG. 3 to illustrate one type of split sheave, which is preferably employed with the power means of FIG. 3; and FIG. 5 is a schematic view of the drawworks or apparatus of this invention, together with a level wind mechanism for controlling the wrapping and unwrapping of the cable or line on the storage drum.

DESCRIPTION OF THE PREFERRED EMBODIMENT

In the drawings, the letter P designates generally the power means of the drawworks or line handling apparatus of this invention. Such drawworks or line handling apparatus also includes a storage drum designated with the letter D. The power means P and the storage drum D are driven by a suitable source of power such as a gasoline, electric, diesel-electric, or diesel engine E having a suitable connection, as will be explained. All of the components of the drawworks or line handling apparatus are preferably mounted upon a skid or movable base S which may then be moved from one location to another. In the use of the invention illustrated in FIG. 1, the skid S is disposed on a drilling rig platform 10 which supports and is used in conjunction with a derrick 11 of any suitable known construction, which together with other apparatus form the typical drilling rig R.

A line L such as a multistranded metallic cable, or any other similar line, is looped around the power means P and is adapted to be wound and unwound with respect to the storage drum D. One end of the line L extends to a load, and in the form of the invention illustrated in the drawings, such end extends over a crown block 12 and to a traveling block 15. In the typical situation, the traveling block 15 is connected by means of an elevator or other support means to drill pipe (not shown) which is being raised and lowered in the derrick 11, and thus, the drill pipe constitutes the load which is being lifted and lowered by the line L when using the apparatus of this invention in conjunction with a drilling rig R. When the apparatus of this invention is used for towing boats, pulling pipelines, or for other uses, it will be evident that the load is the object to which the end of the line L is attached. Thus, although the invention is herein illustrated in its preferred form for use in conjunction with a drilling rig, it will be understood that this invention is applicable for use in any situation wherein a line is to be wound and unwound, and particularly where heavy and long cables or other lines are wound and unwound in conjunction with the pulling or towing of heavy loads.

Considering the invention more in detail, the power means P includes at least a pair of rotatable sheave assemblies A. Each sheave assembly A includes a drive shaft 20 which is supported at its outer ends in suitable bearings 21 carried by a frame or support 22. Normally, the frame or support 22 includes spaced upright plates which are welded or are otherwise secured at each of their lower ends to the steel framework forming the skid S. Each sheave assembly A includes a multitude of sheaves 25, each of which is releasably mounted on the drive shaft 20 in the preferred form of the invention. Thus, as illustrated in FIGS. 3 and 4, each sheave 25 is formed in at least two sections 25a and 25b. In this form of the invention, each drive shaft 20 is formed with an enlarged diameter portion 20a (FIG. 4) which extends throughout the area covered by the sheaves 25 as shown in FIG. 3 and also two releasable retaining collars 26 and 27 on each drive shaft 20. Each drive shaft portion 20a is formed with diametrically opposed longitudinally extending grooves 20b which are adapted to receive inwardly extending retaining lugs 25c on each end of the semicircular sheave sections 25a and 25b. When the collars 26 and 27 are removed from the shaft portion 20a, the drive shaft 20 may then be slipped longitudinally from its bearings 21, or at least the left end of the shaft 20 may be pulled from its bearing 21 so that the sheaves 25 may be removed by longitudinally sliding same to the smaller diameter portion of the shaft 20 and thus passing the longitudinal grooves 20b. It is to be noted that the retaining collars or clamps 26 are of a greater width than the retaining collars or clamps 27 and they are disposed at the opposite ends on the shafts 20 so as to cause the line L to follow a helical path as it is looped around the sheave assemblies A, as illustrated in FIG. 3. The collars or clamps 26 are formed in two semicircular sections with flanges which are releasably bolted together by any suitable releasable connecting means such as bolts and nuts 26a. Likewise, the releasable clamps 27 are formed in semicircular sections which are formed with flanges having releasable connecting means such as bolts and nuts 27a.

In the preferred embodiment of this invention, each drive shaft 20 has a sprocket 30 connected thereto, with a chain 31 interconnecting such sprockets 30. As illustrated in FIG. 3, the shaft 20 also has an additional sprocket 32 formed thereon which has a chain 33 connected thereto from the engine E (FIG. 1- for supplying the power from the engine E to drive the sprocket 33 and thus the shaft 20 upon which it is mounted. The chain 31 thus transmits the rotation of the upper drive shaft 20 to the lower drive shaft 20 so that both are driven by the engine E. In a modified form of the invention, wherein the lower drive shaft 20 is driven by the engine E through an automatic drive, as will be more fully explained hereinafter, an additional sprocket 32 shown in dotted lines in FIG. 3 is utilized. In any event, the sheave assemblies A are both driven at the same speed by a power source such as the engine E so that the rotation of such assemblies A is synchronized. It is possible to also drive each of the sheave assemblies A by a separate drive engine so long as the driving of same is synchronized. More than one engine E may be used for the power source, if desired.

It should be pointed out that each of the sheaves 25 is formed with a single annular groove which has a curvature corresponding substantially to the curvature of the portion of the cable or line L received by the sheaves 25. Because of such conformity of the external surface of each of the sheaves 25 with the external surface of the line L, there is no lateral displacement, snapping, or cutting of the line L as it is moved relative to the sheaves 25. On the other hand, there is a minimum of rubbing or abrasive action between the line L and the sheaves 25 so as to minimize wear and other damage to the external surface of the line L and the sheaves 25. Although the present invention contemplates the use of the split sheaves 25 as previously explained, it should be understood that each of the sheave assemblies A may be a grooved drum or may be formed of solid circular sheaves. However, in such instances, if wear occurs on just portions of the drum or sheaves, the entire assembly would have to be replaced and this would increase the expense of such alternative construction.

Furthermore, when the split sheaves are employed, the sheaves 25 can be replaced when the line L is changed so that the curvature of the external annular groove of each sheave 25 can be of the same curvature as the line L. In this way, the advantage of having the line L fitting within the sheaves 25 is maintained even though the size of the line L is varied with a particular drawworks or apparatus using this invention.

As illustrated in particular in FIGS. 1 and 2, the engine E is a gasoline, electric, diesel-electric, or diesel engine which has sprockets 35 and 36 which are driven thereby. The sprocket 35 is operably connected to the chain 33 which extends to the sprocket 32 on the upper sheave assembly A. The sprocket 36 is connected by a drive chain 37 to a sprocket 38 on an automatic drive 40 which may include a gear box so that the movement of the sprocket 38 is transmitted through the automatic means 40 to a drum drive shaft 41. Thus, the storage drum D is driven by the engine E through the automatic drive 40, which may be a conventional hydramatic drive, fluid coupling, or any other suitable automatic drive of that type. It is to be noted that the drum D is disposed substantially perpendicularly to the axis of rotation of the sheave assembly A. This is the preferred position of the storage drum D so that the length of such drum D may be such that the entire length of the line L which is wound and unwound thereon is disposed in a single layer. However, it should be understood that the drum D may be disposed in other positions so long as there is a sufficient space for the drum to receive the line L in a single layer, as explained.

The free end L' of the line or cable L extends from the lower sheave assembly A to the storage drum D. Normally, the drum D is rotated in a direction to wind the free end L' of the line L thereon in a direction from the right-hand end towards the left as viewed in FIGS. 1 and 2.

To facilitate the wrapping of the line L on the storage drum D, any suitable level wind mechanism may be employed, one of which is indicated by the letter W in FIGS. 1, 2, and 5. The level wind apparatus W includes a small winch 50 which is rotated in synchronism with the rotation of the storage drum D, preferably through a gear box 51 which has a sprocket 62 therewith and which is connected by a chain 53 to a sprocket 54 on the drum D.

A small pull cable 55 is wound on the winch 50 and is connected to a traveling pulley or block 60 through which the free end L' of the line L passes (FIG. 5). The traveling pulley or block 60 is guided along a track or rod 61 by means of a sleeve or slide 62 which slides thereon and which is flexibly connected to the traveling block or pulley 60. Thus, as the drum D is being rotated to wind up the line L thereon, the traveling pulley or block 60 is being pulled by the cable 50 which is winding up same on the winch 50 in synchronism with the rotation of the drum D. The rod or track 61 is substantially parallel to the axis of rotation of the drum D so that the line is guided properly for substantially helical winding in a single layer with the wraps of the line L substantially adjacent each other and without overlapping each other.

When the line L is being unwound from the drum D, the direction of rotation of the drum D is reversed, which likewise reverses the direction of rotation of the winch 50. Thus, as the load on the traveling block 15 pulls the line L to unwind same, the traveling pulley or block 60 is moved towards the right-hand end of the drum D as viewed in FIGS. 1 and 2 in synchronism with the unwinding of the line from the drum D so that the line L is always fed off at the proper angle and direction.

In the event the apparatus of this invention is used in a situation wherein extremely long lengths of line L must be wound and unwound so that the length of the drum D cannot be long enough to wrap the entire length thereon in a single layer, an additional mechanism with the level wind W is preferably employed. For example, when the apparatus of this invention is used for towing boats, barges, or the like on the end of the line L, it will often require extremely long lengths of line to be wound and unwound on the storage drum. For this purpose, the level wind mechanism W includes a means to reverse the travel of the traveling pulley or block 60 when it reaches each end of the storage drum D. Any suitable mechanism may be employed, and therefore such mechanism has been indicated only schematically in FIG. 5, wherein a sliding rod 65 is illustrated as slidably mounted substantially parallel to the axis of rotation of the drum D in supports 66. The rod 65 has upstanding ends 65a which are adapted to be engaged by a pin 62a on the sleeve or slide 62 which is connected on the track 61. The sliding rod 65 is operably connected to a pivoted gear actuating lever 70 which connects with the gear box 51 so that when the pin 62 engages either of the upstanding arms 65a, the gears 51 are changed to change the direction of rotation of the winch 50. The positions of the upstanding arms 65a is such that the reversal in the direction of movement of the winch 50 and therefore the traveling block 60 occurs at each end of the drum D.

When the apparatus of this invention is used for towing boats or similar operations, it is preferable to dispose an automatic drive or fluid transmission between the engine E and the power means P. For this reason, the additional automatic drive or fluid coupling means 80 is illustrated in dotted lines in FIG. 1, with a sprocket 80a therewith. The sprocket 80a is connected by a chain 81 to the sprocket 35 of the engine E or any other suitable sprocket connected to the engine E. The chain 33 is disconnected when the chain 81 is used in conjunction with the automatic drive 80. A chain is also provided from the sprocket 80a or one adjacent thereto as indicated at 82 to the external sprocket 32 showing dotted lines in FIG. 3. Thus, the power means P is then driven by the engine E through the automatic drive or fluid coupling 80, and the lower sheave assembly A is the driven one rather than the upper sheave assembly A as in the embodiment heretofore described. The chain 31 connects the lower sheave assembly A to the upper sheave assembly A so that both are driven. Such fluid coupling or automatic drive 80 controls the paying out or feeding off of the line L so that it feeds off at a predetermined rate, or when the load on the line exceeds a predetermined amount. This is particularly advantageous when towing a boat since sudden surges occur due to wave action and boat or barge movements, which might snap and break such lines if the line L were not permitted to feed off some under such conditions.

When the present invention is used in the embodiment illustrated in the drawings with a drilling rig R, the fast end of the line L which is connected to the load in the derrick such as the drill pipe is wound and unwound by the power means P which exerts the pulling force on the line L. The line L passes in a plurality of loops over the sheaves 25 in each of the sheave assemblies A and then the free end L' is fed from the power means P to the drum D and is then wound on the drum D. The line is substantially free of load at L', or at least it has a minimum amount of load force exerted thereon at the free end L' so that the drum D may be used for winding the line L thereon with a relatively small amount of winding force. This minimizes crushing loads on the line L during the winding. Overlapping and an accumulation of the line L on the drum D is also prevented so that damage due to crushing, snapping, and rubbing from a plurality of wraps on the drum D is avoided. However, as previously noted, even if a plurality of wraps or layers is wound on the drum D, using the level wind mechanism W, this is not as damaging to the line or cable L since relatively small forces are required for the wrapping operation as compared to the conventional manner of winding wherein the full load is also applied to the line L during the wrapping or winding operation.

When a load is pulling on the line L to pay the line out, such as when the traveling block 15 is being lowered in the derrick 11, the direction of rotation of the drum D is reversed to feed off the line therefrom, and the power means P is also reversed to likewise feed off the line L therefrom. This reversing of the engine E is accomplished by the convention transmisison which is with the engine E and which is not specifically illustrated since it is well understood by those skilled in the art.

When the fluid coupling or automatic drive 80 is employed in the system as illustrated in the dotted lines in FIG. 1 and as heretofore described, the paying off or feeding off of the line L from the drum D and the power means P is controlled at a predetermined rate since the fluid coupling will only allow it to pay out at such predetermined rate as set with the fluid coupling. When the line L is being fed off, the engine E may be placed in neutral after the initial feeding off begins, and in that case, the fluid coupling or automatic drive 80 and the automatic drive 40 serve as fluid brakes to limit the feed off speed. It will also be appreciated that brakes of conventional construction are incorporated along with the fluid couplings or automatic drives 40 and 80.

Thus, it can be seen that the present invention provides an apparatus for handling line which may be employed at a drilling rig, on a ship, or in any other situation wherein lines having loads thereon are to be wound and unwound or are to be used for towing purposes. With this invention, the portion of the line which is being wound and unwound on the storage drum is substantially free of any load and therefore a minimum amount of force or load is applied to such line as it is being wrapped and unwrapped on the storage drum.

The foregoing disclosure and description of the invention are illustrative and explanatory thereof, and various changes in the size, shape, and materials as well as in the details of the illustrated construction may be made.

I claim:
1. A line handling apparatus, comprising:
   (a) a power means for exerting a pulling force on a line to move a load on one end of the line;
   (b) a storage drum separate from said power means adapted to receive the other end of the line from said power means;
   (c) means for driving said storage drum at a rate sufficient to wind or unwind the line but with substantially no pulling force on the line;
   (d) said power means having at least two rotatable sheave assemblies;
   (e) each sheave assembly having a drive shaft with a plurality of sheaves disposed side by side on said shaft;
   (f) said line being passed over said sheaves in said assemblies in a plurality of loops and with each sheave having an annular groove which substantially conforms in curvature to the external surface of the portion of the line disposed therein to increase frictional contact therebetween and to minimize abrasion, shifting, and other lateral relative movement between the line and each sheave;
   (g) each sheave being formed in at least two sections; and
   (h) co-acting retaining means on said drive shaft and each of said sheave sections for releasably mounting said sections on the drive shaft to permit removal of the sheaves from the shaft to replace same when worn or with sheaves of different diameters or different groove curvature to thereby accommodate lines of different diameters.

2. The structure set forth in claim 1, wherein:
   (a) the axis of rotation of said storage drum is disposed substantially perpendicular to the axis of rotation of said shafts of said sheave assemblies and is of a length to receive the line thereon in a single layer.

3. The structure set forth in claim 1, wherein said coacting retaining means includes:
   (a) longitudinally extending grooves in said shaft;
   (b) inwardly extending retaining lugs in each of said sheave sections adapted to longitudinally slide into said grooves and lock together for the rotation of said sheave sections with said shaft.

4. The structure set forth in claim 3, including:
   (a) removable clamping devices on each end of said drive shaft for holding said sheave sections assembled thereon in contact with each other.

5. The structure set forth in claim 4, wherein:
   (a) the removable clamping devices on the ends of each of the shafts are of different widths; and
   (b) the wider clamping device on one shaft being disposed opposite the narrower clamping device on the other of said shafts to offset said sheaves on said one of said shafts with respect to the sheaves on said other of said shafts to cause the line looped around said sheaves to follow a helical path.

References Cited

UNITED STATES PATENTS

| | | | |
|---|---|---|---|
| 2,948,483 | 8/1960 | Petersen | 254—175.7 |
| 3,037,720 | 6/1962 | Leithiser | 254—175.7 |
| 3,285,575 | 11/1966 | Griffiths | 254—183 |
| 3,298,462 | 1/1967 | Morris | 254—184 |
| 3,300,187 | 1/1967 | Saxe | 254—175.7 |

FOREIGN PATENTS 255,302   7/1926   Great Britain.

HARVEY C. HORNSBY, Primary Examiner

U.S. Cl. X.R.

242—54; 254—190